United States Patent
Shingaki et al.

(10) Patent No.: US 12,428,695 B2
(45) Date of Patent: Sep. 30, 2025

(54) GRAIN-ORIENTED ELECTRICAL STEEL SHEET AND METHOD OF PRODUCING SAME

(71) Applicant: JFE STEEL CORPORATION, Tokyo (JP)

(72) Inventors: Yukihiro Shingaki, Tokyo (JP); Yusuke Shimoyama, Tokyo (JP); Akifumi Harada, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 669 days.

(21) Appl. No.: 17/753,482

(22) PCT Filed: Sep. 4, 2020

(86) PCT No.: PCT/JP2020/033662
§ 371 (c)(1),
(2) Date: Mar. 4, 2022

(87) PCT Pub. No.: WO2021/045212
PCT Pub. Date: Mar. 11, 2021

(65) Prior Publication Data
US 2022/0333220 A1 Oct. 20, 2022

(30) Foreign Application Priority Data
Sep. 6, 2019 (JP) ................................. 2019-163264

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/001* (2013.01); *C21D 6/002* (2013.01); *C21D 6/008* (2013.01);
(Continued)

(58) Field of Classification Search
CPC ...... C21D 9/46; C21D 8/1222; C21D 8/1272; C21D 8/1283; C21D 2201/05;
(Continued)

(56) References Cited

U.S. PATENT DOCUMENTS 1,965,559 A 7/1934 Goss
3,932,234 A 1/1976 Imanaka et al.
(Continued)

FOREIGN PATENT DOCUMENTS

CN 104870665 A 8/2015
CN 104870666 A 8/2015
(Continued)

OTHER PUBLICATIONS

Yoshitomi Yasunari et.al. [JPH06228646A] (Machine Translation, (Year: 1994).*

(Continued)

*Primary Examiner* — Sally A Merkling
*Assistant Examiner* — Nazmun Nahar Shams
(74) *Attorney, Agent, or Firm* — KENJA IP LAW PC

(57) ABSTRACT

Disclosed is a grain-oriented electrical steel sheet capable of obtaining excellent magnetic properties stably over the entire coil length. A grain-oriented electrical steel sheet includes: a chemical composition containing, in mass %, C: 0.005% or less, Si: 2.0% to 4.5%, and Mn: 0.01% to 0.5%, and, in mass ppm, N: 20 ppm or less, each of Se, Te, and O: less than 50 ppm, S: less than 30 ppm, and acid-soluble Al: less than 40 ppm, and Ti: less than 30 ppm, of which 5 ppm or more and 25 ppm or less is acid-soluble Ti, with the balance being Fe and inevitable impurities; and precipitates containing Ti and N with a grain size of 200 nm or more at a frequency of 0.05 grains/mm$^2$ or more.

5 Claims, 2 Drawing Sheets

(51) Int. Cl.
  *C21D 8/12*   (2006.01)
  *C22C 38/00*  (2006.01)
  *C22C 38/06*  (2006.01)
  *C22C 38/08*  (2006.01)
  *C22C 38/12*  (2006.01)
  *C22C 38/16*  (2006.01)
  *C22C 38/34*  (2006.01)
  *H01F 1/147*  (2006.01)

(52) U.S. Cl.
  CPC ......... *C21D 8/1222* (2013.01); *C21D 8/1233* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/06* (2013.01); *C22C 38/08* (2013.01); *C22C 38/12* (2013.01); *C22C 38/16* (2013.01); *C22C 38/34* (2013.01); *H01F 1/14775* (2013.01)

(58) Field of Classification Search
  CPC ... C22C 38/001; C22C 38/002; C22C 38/008; C22C 38/06; C22C 38/14
  USPC ......................................................... 148/111
  See application file for complete search history.

(56) References Cited

U.S. PATENT DOCUMENTS

| | | | |
|---|---|---|---|
| 6,103,022 | A | 8/2000 | Komatsubara et al. |
| 6,309,473 | B1 | 10/2001 | Hayakawa et al. |
| 8,177,920 | B2 | 5/2012 | Shingaki et al. |
| 9,340,860 | B2 | 5/2016 | Furuhashi et al. |
| 9,708,682 | B2 | 7/2017 | Hayakawa et al. |
| 9,905,343 | B2 | 2/2018 | Shingaki et al. |
| 9,953,752 | B2 | 4/2018 | Shingaki et al. |
| 10,851,431 | B2 | 12/2020 | Han et al. |
| 2012/0312424 | A1 | 12/2012 | Murakami et al. |
| 2018/0171425 | A1 | 6/2018 | Shingaki et al. |
| 2018/0202018 | A1 | 7/2018 | Imamura et al. |
| 2019/0085423 | A1 | 3/2019 | Hayakawa et al. |
| 2019/0112685 | A1 | 4/2019 | Takenaka et al. |
| 2019/0233914 | A1 | 8/2019 | Hayakawa et al. |
| 2021/0130937 | A1* | 5/2021 | Han .................... C22C 38/001 |
| 2021/0317319 | A1* | 10/2021 | Terashima ............... H01F 1/18 |

FOREIGN PATENT DOCUMENTS

| | | |
|---|---|---|
| CN | 104884644 A | 9/2015 |
| CN | 108291268 A | 7/2018 |
| CN | 108699619 A | 10/2018 |
| EP | 3235914 A1 | 10/2017 |
| EP | 3492613 A1 | 6/2019 |
| JP | S4015644 B | 7/1965 |
| JP | S5113469 B2 | 4/1976 |
| JP | H04293725 A | 10/1992 |
| JP | H06228646 A | 8/1994 |
| JP | 2000129356 A | 5/2000 |
| JP | 2005272973 A | 10/2005 |
| JP | 2006152387 A | 6/2006 |
| JP | 2008214700 A | 9/2008 |
| JP | 2015004091 A | 1/2015 |
| JP | 2018505962 A | 3/2018 |
| KR | 1020180073323 A | 7/2018 |

OTHER PUBLICATIONS

Jul. 26, 2022, Office Action issued by the China National Intellectual Property Administration in the corresponding Chinese Patent Application No. 202080062277.0 with English language search report.

Nov. 17, 2020, International Search Report issued in the International Patent Application No. PCT/JP2020/033662.

Jul. 3, 2023, the Partial Supplementary European Search Report issued by the European Patent Office in the corresponding European Patent Application No. 20861748.0.

Mar. 1, 2023, Office Action issued by the China National Intellectual Property Administration in the corresponding Chinese Patent Application No. 202080062277.0 with English language search report.

Yan Feng et al., Foreign Continuous Casting Technology, 6 continuous casting-direct rolling, Jul. 31, 1991 with a partial English translation.

Feb. 15, 2022, Notification of Reasons for Refusal issued by the Japan Patent Office in the corresponding Japanese Patent Application No. 2021-507876 with English language concise statement of relevance.

\* cited by examiner

GRAIN-ORIENTED ELECTRICAL STEEL SHEET AND METHOD OF PRODUCING SAME

TECHNICAL FIELD

This disclosure relates to a grain-oriented electrical steel sheet having stable magnetic properties and excellent iron loss properties, and a method for producing the same.

BACKGROUND

Grain-oriented electrical steel sheets are a material mainly used for iron cores of transformers and the like. In recent years, the demand for energy saving of such iron cores has been increasing. Accordingly, grain-oriented electrical steel sheets, which are the material of iron cores, are also required to have superior magnetic properties, i.e., low iron loss and high magnetic flux density.

A grain-oriented electrical steel sheet has a crystal structure in which the <001> orientation, which is an easy magnetization axis of iron, is highly accorded with the rolling direction of the steel sheet. Such texture is formed in the manufacturing process of the grain-oriented electrical steel sheet, in particular during secondary recrystallization in the final annealing, in which the growth of giant crystal grains is preferentially caused in the {110}<001> orientation, which is so-called Goss orientation. Therefore, the crystal orientation of secondary recrystallized grains has a major influence on the magnetic properties of grain-oriented electrical steel sheets.

Conventionally, such grain-oriented electrical steel sheets are produced by the following process.

A steel slab containing 4.5 mass % or less of Si and elements that form inhibitors, such as MnS, MnSe, AlN and BN, is heated to 1300° C. or higher, hot rolled, and optionally, subjected to hot-rolled sheet annealing, then subjected to cold rolling once, or twice or more with intermediate annealing performed therebetween, to thereby obtain a hot-rolled sheet having a final sheet thickness, then subjected to primary recrystallization annealing in a wet hydrogen atmosphere so as to be decarburized, then coated with an annealing separator mainly composed of magnesia, and then subjected to final annealing at 1200° C. for about 5 hours for secondary recrystallization and purification of inhibitor-forming elements (e.g., U.S. Pat. No. 1,965,559B (PTL 1), JPS40-15644B (PTL 2), and JPS51-13469B (PTL 3)).

However, in the manufacturing process of such a grain-oriented electrical steel sheet, high-temperature slab heating is essential because of inhibitor-forming elements, and the manufacturing cost is extremely high. To address this issue, methods of enabling secondary recrystallization without the inclusion of inhibitor-forming elements, so-called inhibitor-less methods, have been developed (e.g., JP2000-129356A (PTL 4)).

The technical idea of inhibitor-less methods is completely different from that of other conventional methods of producing grain-oriented electrical steel sheets. Specifically, while the other conventional methods use precipitates (inhibitors) such as MnS, MnSe, and AlN to develop secondary recrystallization, the inhibitor-less methods do not use inhibitors, but rather uses higher purity to reduce the resistance to grain boundary migration, which makes the intrinsic grain boundary migration speed difference, which depends on the grain boundary characteristics, apparent, thereby achieving desired secondary recrystallization.

Since the inhibitor-less methods contain almost no inhibitor elements at the first place, the high-temperature slab heating process required for the dissolution of inhibitor components is unnecessary, making it possible to produce grain-oriented electrical steel sheets at low cost.

CITATION LIST

Patent Literature

PTL 1: U.S. Pat. No. 1,965,559B
PTL 2: JPS40-15644B
PTL 3: JPS51-13469B
PTL 4: JP2000-129356A

SUMMARY

Technical Problem

When grain-oriented electrical steel sheets are produced by an inhibitor-less method, a very small amount of impurity elements precipitate unevenly in the steel, resulting in uneven secondary recrystallization, and the magnetic properties of the finally produced grain-oriented electrical steel sheets vary greatly even in a single coil, and this phenomenon emerged as another issue.

To address this issue, JP2006-152387A (PTL 5) proposed a technology to obtain stable magnetic properties by reducing the amount of those oxides containing Ca and/or Mg with a diameter of 1 μm to 3 μm. As a result, stable magnetic properties can be obtained over the entire coil length.

PTL 5: JP2006-152387A

However, even with the above technology, when slabs for the inhibitor-less methods containing 20 ppm or more of acid-soluble Al are used, the magnetic properties may not be stable due to the strong influence of the thermal hysteresis of annealing in the intermediate process.

To address the above issues, it would thus be helpful to provide a grain-oriented electrical steel sheet having stable and excellent magnetic properties over the entire coil length.

Solution to Problem

The present inventors evaluated the characteristics of those raw materials that had a large "variation" of magnetic properties at a certain frequency in the coils, by various methods, and made further investigations to clarify the characteristics.

As a result, it was revealed that the characteristics of those products having a large "variation" in the properties were as follows: among the Ti contained in the steel, acid-soluble Ti was less than 5 ppm or more than 25 ppm, and precipitates containing Ti and N with a grain size of 200 nm or more were less than 0.05 pieces/mm$^2$. For the evaluation of precipitates in the steel, a sample was cut out from the center position of the widthwise and longitudinal directions of each product coil, and the cross section in the rolling direction (i.e., L direction) was observed in a continuous field of view over an area of 90 mm$^2$. Then, compositional analysis by EDX was performed on all grains with a diameter of 200 nm or more in the equivalent diameter from the reflection electron images of the grains, and the number of grains containing both Ti and N was counted, divided by the area of the observation field, and the result was evaluated.

Normally, when grain-oriented electrical steel sheets are produced by an inhibitor-less method, acid-soluble Ti is often precipitated as TiN, which can also function as an inhibitor. Thus, a lower acid-soluble Ti is preferable. However, since Ti is an element contained in various alloy elements and scrap, Ti can be mixed in the steel and contained as an impurity.

In the present findings described above, the reason for the large magnetic fluctuation in the final product coils when the acid-soluble Ti exceeded 25 ppm may be that TiN acted as an inhibitor and formed a non-uniform microstructure. On the other hand, the range of acid-soluble Ti<5 ppm was observed as a characteristic of the coil with large magnetic property fluctuation, which indicates that a certain amount of acid-soluble Ti contributes to the magnetic stabilization. Such findings suggest that magnetic property instability may occur at a certain frequency if the acid-soluble Ti is not properly controlled and is left to be mixed as impurities during the production process.

In addition, the presence of Ti and N as grains of 200 nm or more in grain size in the product coils, at a frequency of less than 0.05 grains/mm$^2$, was characterized by a large magnetic fluctuation. The precipitates that are usually used as inhibitors have a grain size of less than 100 nm. A grain size of 200 nm or more inevitably results in a lower density and a lower function as an inhibitor. Ti also forms oxides (TiO$_2$) and nitrides (TiN). However, oxides are not soluble in acid. Thus, the acid-soluble Ti is considered to be evaluated as existing as nitrides. The grains observed were also present in the form of TiN, as N was detected together with Ti. Here, it is known that TiN acts as a precipitation site for sulfides such as MnS. Since TiN is a nitride, it also functions as a precipitation site for nitrides such as AlN. In fact, the grains observed were in the form of complex precipitation, as illustrated in FIGS. 1A and 1B, where they were observed together with sulfides, nitrides, as well as oxides of Si and Al.

From these observations, it was found that the cause of the suppression of the variation of the resulting magnetic properties may be that an appropriate amount of Ti, when present as a nitrogen-containing precipitate with an appropriate size, acts as a site for complex precipitation and promotes a high purity condition, which is important in inhibitor-less systems.

The inventors further examined such findings and completed the present disclosure. We thus provide:

1. A grain-oriented electrical steel sheet comprising: a chemical composition containing (consisting of), in mass %, C: 0.005% or less, Si: 2.0% to 4.5%, and Mn: 0.01% to 0.5%, and, in mass ppm, N: 20 ppm or less, each of Se, Te, and O: less than 50 ppm, S: less than 30 ppm, and acid-soluble Al: less than 40 ppm, and Ti: less than 30 ppm, of which 5 ppm or more and 25 ppm or less is acid-soluble Ti, with the balance being Fe and inevitable impurities; and precipitates containing Ti and N with a grain size of 200 nm or more at a frequency of 0.05 grains/mm$^2$ or more.

2. The grain-oriented electrical steel sheet according to aspect 1, wherein the chemical composition further contains, in mass %, at least one selected from the group consisting of Ni: 1.50% or less, Sn: 0.50% or less, Sb: 0.50% or less, Cu: 0.50% or less, Mo: 0.50% or less, P: 0.50% or less, Cr: 1.50% or less, B: 0.0050% or less, and Nb: 0.0100% or less.

3. A method of producing the grain-oriented electrical steel sheet as recited in aspect 1, the method comprising: casting a steel slab from molten steel, the steel slab having a chemical composition containing (consisting of), in mass %, C: 0.08% or less, Si: 2.0% to 4.5%, and Mn: 0.01% to 0.5%, and, in mass ppm, Ti: less than 50 ppm, each of Se, Te, and O: less than 50 ppm, S: less than 50 ppm, acid-soluble Al: 20 ppm or more and less than 100 ppm, and N: 80 ppm or less, with the balance being Fe and inevitable impurities; hot rolling the steel slab to obtain a hot-rolled sheet; then annealing and rolling the hot-rolled sheet to obtain a cold-rolled sheet having a final sheet thickness; then subjecting the cold-rolled sheet to primary recrystallization annealing; then subjecting the cold-rolled sheet to secondary recrystallization annealing; and then forming an insulating coating on the cold-rolled sheet, wherein the molten steel contains Ti in an amount of less than 50 ppm, of which 5 ppm or more and 30 ppm or less is acid-soluble Ti.

4. A method of producing the grain-oriented electrical steel sheet as recited in aspect 1, the method comprising: casting a steel slab from molten steel, the steel slab having a chemical composition containing (consisting of), in mass %, C: 0.08% or less, Si: 2.0% to 4.5%, and Mn: 0.01% to 0.5%, and, in mass ppm, Ti: less than 50 ppm, each of Se, Te, and O: less than 50 ppm, S: less than 50 ppm, acid-soluble Al: 20 ppm or more and less than 100 ppm, and N: 80 ppm or less, with the balance being Fe and inevitable impurities; subjecting the steel slab to hot rolling including an initial rolling reduction after which the steel slab is held at a temperature of 1000° C. or higher for a period of 40 seconds or more to obtain a hot-rolled sheet; then annealing and rolling the hot-rolled sheet to obtain a cold-rolled sheet having a final thickness; then subjecting the cold-rolled sheet to primary recrystallization annealing; then subjecting the cold-rolled sheet to secondary recrystallization annealing; and then forming an insulating coating on the cold-rolled sheet, wherein the molten steel has a chemical composition adjusted such that a Si-containing ferroalloy, an Al-containing ferroalloy, and a Ti-containing ferroalloy are added in order of adding 50% or more of a total amount of the Ti-containing ferroalloy after adding the Si-containing ferroalloy and before adding the Al-containing ferroalloy, to make an amount of Ti in the molten steel at least less than 50 ppm, of which 5 ppm or more and 30 ppm or less is acid-soluble Ti.

5. The method of producing the grain-oriented electrical steel sheet as recited in aspect 2 according to aspect 3 or 4, wherein the chemical composition of the steel slab as recited in aspect 3 or 4 further contains, in mass %, at least one selected from the group consisting of Ni: 0.005% to 1.50%, Sn: 0.01% to 0.50%, Sb: 0.005% to 0.50%, Cu: 0.01% to 0.50%, Mo: 0.01% to 0.50%, P: 0.0050% to 0.50%, Cr: 0.01% to 1.50%, B: 0.0001% to 0.0050%, and Nb: 0.0005% to 0.0100%.

6. A hot-rolled steel sheet for use in production of a grain-oriented electrical steel sheet, the hot-rolled steel sheet containing Ti in an amount of less than 50 ppm, of which 5 ppm or more and 30 ppm or less is acid-soluble Ti.

7. The hot-rolled steel sheet for use in production of a grain-oriented electrical steel sheet according to aspect 6, further containing precipitates containing Ti and N with a grain size of 200 nm or more at a frequency of 0.05 grains/mm$^2$ or more.

Advantageous Effect

According to this disclosure, a grain-oriented electrical steel sheet having stable and excellent magnetic properties over the entire length of a coil can be obtained using an inhibitor-less method. This disclosure also enables production of such a grain-oriented electrical steel sheet in an advantageous manner.

DETAILED DESCRIPTION

Figure 1A:
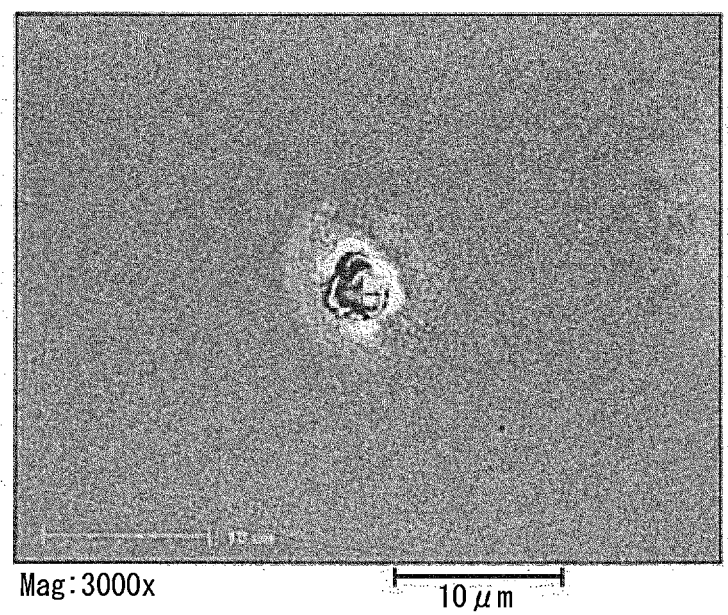
FIG. 1A illustrates SEM images and EDX analysis results of precipitates on a surface of a steel sheet.
Figure 1A:
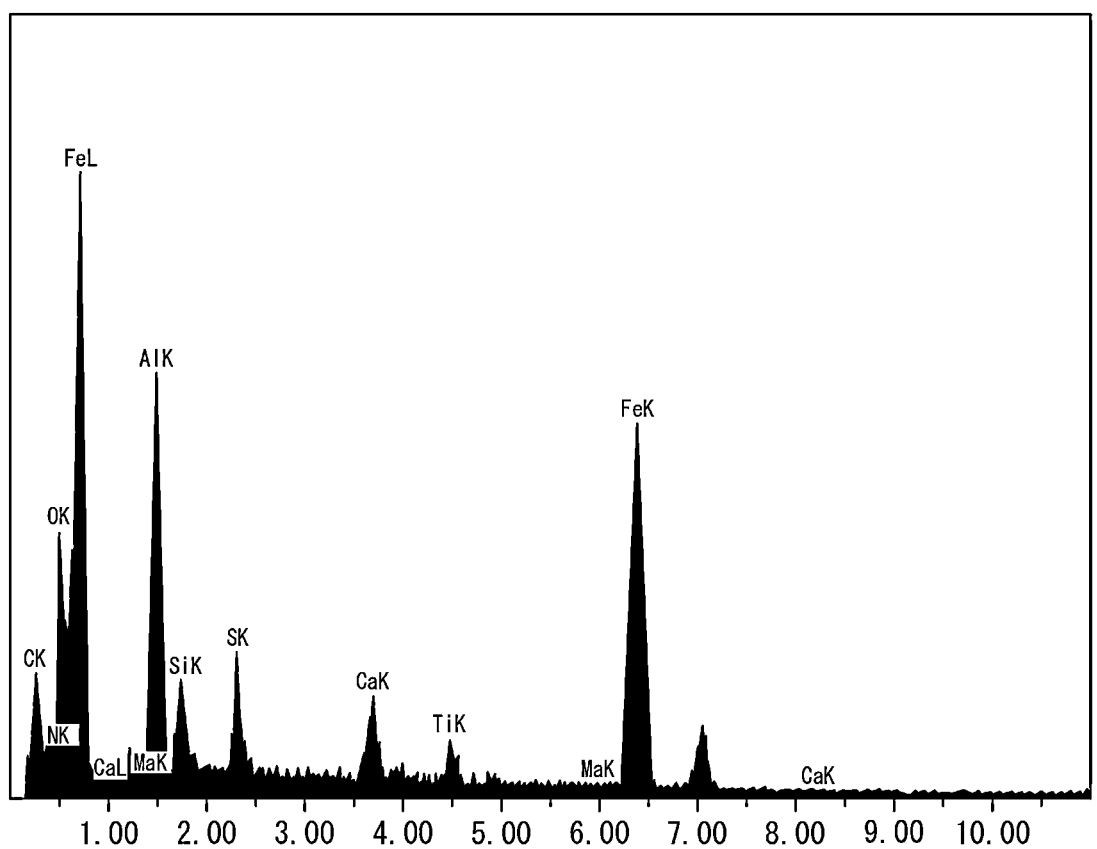
Figure 1B:
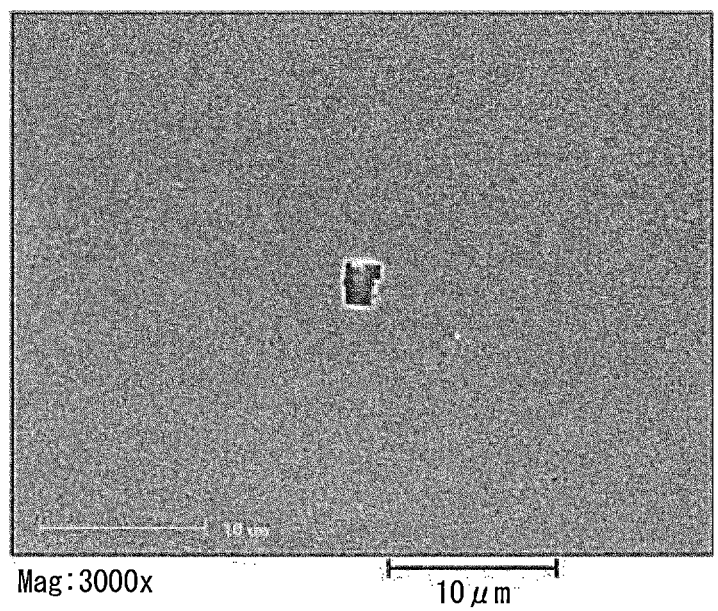
FIG. 1B illustrates SEM images and EDX analysis results of precipitates on a surface of another steel sheet.
Figure 1B:
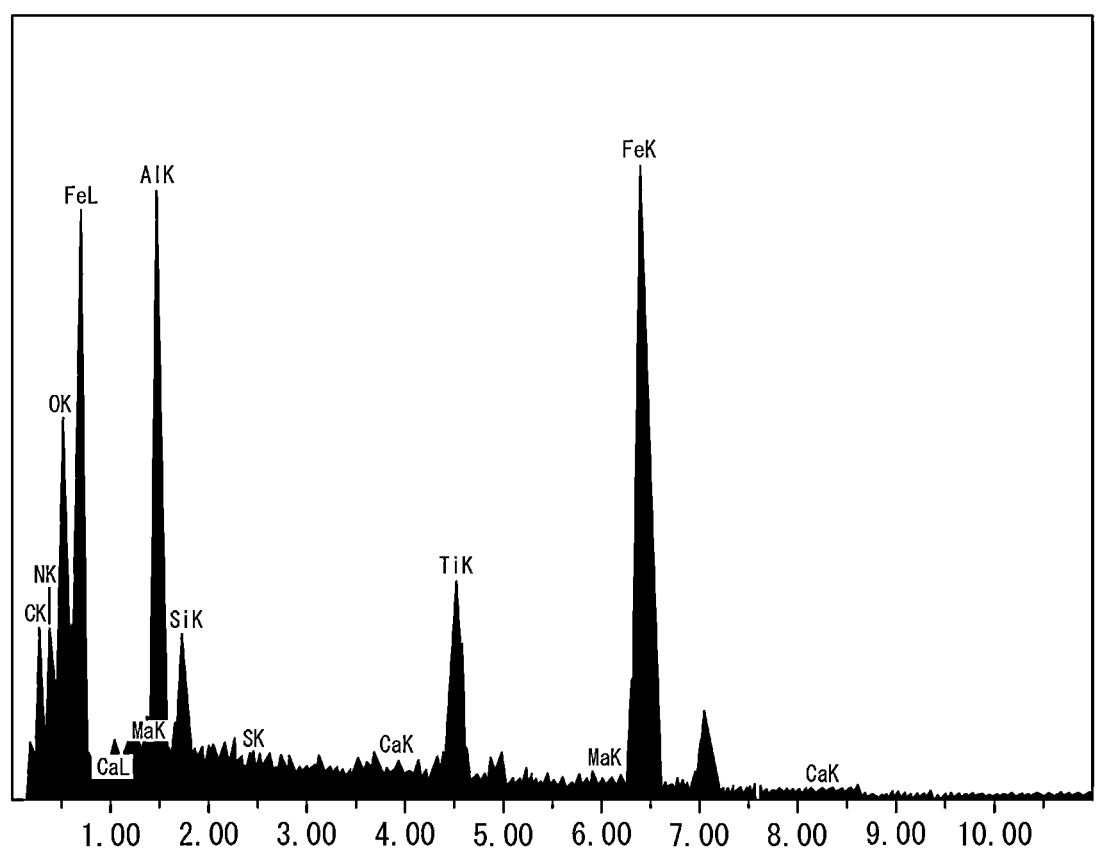

The present disclosure will now be described in detail based on its production method.

First, the reason for limiting the chemical composition of a steel slab, which is the starting material when producing a grain-oriented electrical steel sheet, is described. In the following, the indications of "%" and "ppm" for components shall mean mass % and mass ppm unless otherwise specified.

C: 0.08% or Less

C suppresses crystal grain coarsening during hot rolling and improves the pre-cold-rolled microstructure. In cold rolling, C improves the texture after primary recrystallization by interaction with dislocations. However, if it remains in a steel sheet as a finished product, it causes magnetic aging and magnetic deterioration. If it is contained in the slab in an amount of more than 0.08%, the load becomes high during the decarburization process and cannot be reduced sufficiently. Therefore, the C content is limited to 0.08% or less. To obtain the above-mentioned microstructure improving effect, the lower limit of the C content is desirably 0.01%.

Si: 2.0% to 4.5%

Si is a useful element that improves iron loss by increasing electrical resistance. If the Si content is less than 2.0%, sufficient iron loss reduction effect cannot be obtained, and if the Si content is more than 4.5%, cold rolling becomes extremely difficult. Therefore, the Si content is limited to the range of 2.0% to 4.5%. The Si content is preferably 2.0% or more. It is preferably 4.0% or less.

Mn: 0.01% to 0.5%

Mn is a useful element to improve hot workability. However, when the Mn content exceeds 0.5%, the primary recrystallized texture deteriorates and it becomes difficult to obtain secondary recrystallization grains that are highly accorded with the Goss orientation. To improve the hot workability, it is necessary to contain Mn in an amount of 0.01% or more. The Mn content is preferably 0.03% or more. It is preferably 0.15% or less.

Each of Se, Te, and O: Less Than 50 ppm

When Se and Te are present in excess, selenides and tellurides are formed and secondary recrystallization becomes difficult. The reason for this is that the precipitates coarsened by slab heating make the primary recrystallized texture non-uniform. Therefore, the content of Se and Te should be suppressed to less than 50 ppm each to prevent them from acting as inhibitors. The content of Se and Te is preferably 30 ppm or less each. In addition, O forms oxides, which remain as inclusions in the final product and degrade the magnetic properties. Therefore, the O content needs to be kept below 50 ppm. The content of these elements may be 0%.

Acid-Soluble Al: 20 ppm or More and Less Than 100 ppm, S: Less Than 50 ppm, N: 80 ppm or Less When the inhibitor-less method is applied, these precipitate-forming elements are not necessarily contained if only secondary recrystallization is considered. However, when contained in a proper amount, Al can form a dense $Al_2O_3$ film on the surface during secondary recrystallization annealing and reduce the effects of nitriding, for example, from the annealing atmosphere. Therefore, the Al content is 20 ppm or more and less than 100 ppm.

If S and N are each contained in an amount of 50 ppm or more and more than 80 ppm, respectively, as in the case of Se and Te, the precipitates formed during slab heating become coarse and deteriorate the primary recrystallized texture. Therefore, the upper limit is limited to the values mentioned above.

The lower limit of the amount of S and N added is preferably 0%. However, these elements are difficult to remove completely, and actually reducing S to less than 10 ppm and N to less than 20 ppm significantly increases the production cost. The inhibitor-less method is intended to produce high-quality grain-oriented electrical steel sheets at low cost, and the above values are specified as the lower limit from the viewpoint of reducing the burden during production.

The present disclosure can stabilize the magnetic properties of steel sheet coils by fixing the sulfides and nitrides formed by such S and N with an appropriate amount of Ti to achieve pseudo high purity.

Next, regarding Ti in the molten steel to be subjected to continuous casting, the amount of Ti should be less than 50 ppm, of which 5 ppm or more and 30 ppm or less should be acid-soluble Ti.

The Ti in the steel forms grains such as $TiO_2$ and TiN. If the inclusions and precipitates formed in this way are present in excess, they lead to deterioration of magnetic properties, especially hysteresis loss. Therefore, the Ti content should be controlled to less than 50 ppm. Then, the acid-soluble Ti, which leads to TiN precipitation in the subsequent process, is controlled within the range of 5 ppm to 30 ppm. If high-purity ferroalloys that do not contain Ti as an impurity are to be used as the raw material, it is necessary to add alloying elements that serve as Ti sources separately. Therefore, in order to reduce the production cost, the present disclosure can take measures to increase the amount of Ti by actively using ferroalloys with low purity.

In the present disclosure, it is preferable that the molten steel has a chemical composition adjusted such that a Ti-containing ferroalloy, a Si-containing ferroalloy, and an Al-containing ferroalloy are added in order of adding 50% or more of a total amount of the Ti-containing ferroalloy after adding the Si-containing ferroalloy and before adding the Al-containing ferroalloy. Since Ti is a strong deoxidation element, when it is added at a stage where the oxygen content in the molten steel is high, it combines with the oxygen to form $TiO_2$, which makes it difficult to form acid-soluble Ti. Therefore, it is preferable to adopt the procedure of adding Si before the addition of Ti source.

Through this procedure, the oxygen in the molten steel rises to some extent in the slag in the form of $SiO_2$ and is removed from the steel. This will increase the Ti yield and increase the amount of acid-soluble Ti in a moderate range.

On the other hand, Al is known to be a stronger deoxidation element than Ti. Therefore, the oxygen in the molten steel after the addition of Al is removed by Al in the form of $Al_2O_3$, and most of the added Ti is expected to be all in the form of acid-soluble Ti, which may cause the acid-soluble Ti in the molten steel to exceed 30 ppm.

Therefore, in the case of performing component adjustment using an inexpensive ferroalloy having relatively low purity and containing Ti as an impurity, after adding a Si-containing ferroalloy, a Ti-containing ferroalloy is added at 50% or more of the total amount to the moderatelydissolved oxygen, and after analyzing the acid-soluble Ti after the addition, the Al-containing ferroalloy is added. Then, the rest of the Ti-containing ferroalloy can be added at a higher Ti yield, and the Ti content can be controlled to an appropriate range. Such a method makes it possible to control the Ti content within an appropriate range without using a particularly pure ferroalloy. Of course, such a method is not always necessary if the chemical composition is adjusted by high purity ferroalloys.

Although the essential elements and inhibiting elements have been described above, in the present disclosure, one or more of the other elements described below may be selected and contained as appropriate.

Ni: 0.005% to 1.50%

Ni serves to increase the uniformity of the microstructure of a hot rolled sheet, and thus improve the magnetic properties. However, if the Ni content is less than 0.005%, the effect of the addition is poor, while if the content exceeds 1.50%, secondary recrystallization becomes unstable and magnetic properties deteriorate. Therefore, it is desirable to contain Ni in the range of 0.005% to 1.50%.

Sn: 0.01% to 0.50%, Sb: 0.005% to 0.50%, Cu: 0.01% to 0.50%

These elements are sometimes regarded as auxiliary inhibitors through grain boundary segregation, but they may be useful in inhibitor-less methods that do not actively utilize inhibitors by precipitation. If the value of each element is less than the lower limit, the addition effect is poor, while if the value exceeds the upper limit, the possibility of secondary recrystallization failure increases.

P: 0.0050% to 0.50%, Cr: 0.01% to 1.50%

These elements have the effect of making the reaction good during forsterite film formation. If the content of each element is less than the lower limit, the addition effect is poor, while if the content of each element is greater than the upper limit, the formation of forsterite film will be accelerated too much, causing problems such as peeling of the film.

Mo: 0.01% to 0.50%, B: 0.0001% to 0.0050%, Nb: 0.0005% to 0.0100%

All of these elements contribute to the suppression of grain growth and have the effect of improving the texture and stabilizing secondary recrystallization. In order to obtain such effects efficiently, it is preferable to contain each of them in the above range. When added in excess, each added element precipitates in the steel and acts as a strong inhibitor. Therefore, it is not desirable to contain any of these elements more than the upper limit in the inhibitor-less method.

The balance consists of iron and impurities other than those mentioned above, especially inevitable impurities.

A steel slab adjusted to the aforementioned suitable chemical composition range is, after or without being reheated, hot rolled. In the case of reheating the slab, the reheating temperature is desirably about 1000° C. or higher. It is desirably about 1300° C. or lower. In particular, slab heating above 1300° C. is unnecessary because it is meaningless for the present disclosure, which contains almost no inhibitor in the steel at the slab stage, and ends up increasing the cost.

After this, hot rolling is carried out. it is desirable that after the first rolling (initial rolling reduction) is performed, the material is held at a temperature of 1000° C. or higher for a period of 40 seconds or more. This is because it is an even more effective process to make the acid-soluble Ti into TiN, the precipitates of which have a grain size of 200 nm or more. In other words, the above holding after the initial pass may introduce dislocations around TiN, which is already in the precipitation state, and increase the diffusion rate of N or the like around TiN, thereby making it easier to control the grain size of precipitates containing Ti and N in an appropriate range. Although no upper limit is placed on the holding time, from a manufacturing standpoint, the upper limit is desirably 600 seconds or less. From the viewpoint of ensuring 1000° C. after the initial pass of hot rolling, the lower limit of the slab heating temperature is desirably 1100° C. or higher.

The grains containing both Ti and N with an appropriate grain size thus formed are hardly changed in the subsequent process, and exhibit the effect of achieving pseudo high purity by providing precipitation sites of sulfides and nitrides in the subsequent process. The present inventors believe that this effect is similar to the effect used in the technology of trapping C in steel by adding Ti, for example, to make IF steel.

Then, the hot-rolled sheet is subjected to hot-rolled sheet annealing as necessary, and then subjected to cold rolling once, or twice or more with intermediate annealing performed therebetween to obtain a final cold-rolled sheet. The cold rolling may be performed at room temperature. Alternatively, warm rolling where rolling is performed with the steel sheet temperature raised to a temperature higher than room temperature, e.g., around 250° C., is also applicable.

The final cold-rolled sheet is subjected to primary recrystallization annealing. The aim of the primary recrystallization annealing is to cause the primary recrystallization of the cold rolled sheet having rolled microstructure to adjust it to an optimal primary recrystallized grain size for secondary recrystallization. The annealing atmosphere is wet hydrogen nitrogen or wet hydrogen argon, which decarburizes the carbon contained in the steel and at the same time forms an oxide film on the surface in the annealing atmosphere. For this purpose, it is desirable that the annealing temperature (holding temperature) of primary recrystallization annealing is approximately from 800° C. or higher to lower than 950° C. In addition, it is effective to increase the heating rate in the heating process of primary recrystallization annealing in order to make the texture even better. Specifically, an improvement can be expected by increasing the heating rate between 500° C. and 700° C. to 80° C./s or higher.

After the primary recrystallization annealing described above, an annealing separator is applied to the steel sheet surface. Magnesia (MgO) is used as the main annealing separator to form a forsterite film on the surface of the steel sheet after the subsequent secondary recrystallization annealing. The formation of a forsterite film can be further favored by adding an appropriate amount of Ti oxides, Sr compounds, or the like to the separator. In particular, the addition of auxiliaries that promote uniform forsterite film formation is also advantageous for improving peeling properties. This is followed by final annealing for secondary recrystallization and forsterite film formation. The annealing atmosphere for such final annealing can be $N_2$, Ar, $H_2$, or mixed gas of any of these. Since precipitation of trace components in the final product will lead to degradation of magnetic properties, the maximum annealing temperature is preferably 1100° C. or higher for component purification.

Since the steel sheet of the present disclosure has little variation in magnetic properties in a coil, it is desirable to perform final annealing in a coil with a mass of 5 tons or more, more preferably 10 tons or more, for economic reasons.

After the above-mentioned final annealing, an insulating coating can be further applied to the steel sheet surface and baked. Such an insulation coating is not limited to a particular type, and any conventionally known insulation coating is applicable. For example, preferred methods are described in JPS50-79442A and JPS48-39338A where a coating liquid containing phosphate-chromate-colloidal silica is applied on a steel sheet and then baked at a temperature of around 800° C.

As a result of purification by final annealing, the final product obtained has a composition such that the steel substrate of the steel sheet after removing the insulating coating and the base film contains C: 0.005% or less, Si: 2.0% to 4.5%, Mn: 0.01% to 0.5%, N: 20 ppm or less, each of Se, Te, and O: less than 50 ppm each, S: less than 30 ppm, acid-soluble Al: less than 40 ppm, Ti: less than 30 ppm, of which 5 ppm or more and 25 ppm or less is acid-soluble Ti, and precipitates containing Ti and N with a grain size of 200 nm or more at a frequency of 0.05 grains/mm$^2$ or more. Regarding N, S, and Al, 3 ppm or more of N, 5 ppm or more of S, and 5 ppm or more of Al are acceptable from the perspective of production cost. In addition, the grain-oriented electrical steel sheet disclosed herein may further contain, in mass %, at least one selected from the group consisting of Ni: 1.50% or less, Sn: 0.50% or less, Sb: 0.50% or less, Cu: 0.50% or less, Mo: 0.50% or less, P: 0.50% or less, Cr: 1.50% or less, B: 0.0050% or less, and Nb: 0.0100% or less, in order to improve magnetic properties, and the like.

Among the above-mentioned additive elements, those for which no lower limit is specified are those for which there is no particular lower limit, and are permitted up to below the lower limit of analysis including 0. Other elements may be incorporated into the forsterite film or released into the gas phase, depending on the final annealing conditions, and their content in the steel may decrease, and some of them may be less than the concentration when contained in the slab within the above ranges, respectively.

EXAMPLES

Example 1

In addition to the main components, C: 0.06%, Si: 3.35%, and Mn: 0.03%, slabs of various compositions containing other components listed in Table 1 were prepared by smelting. The concentrations of Se, Te, and O were all 30 ppm. The concentration of Ti was adjusted using Ti lumps, and the concentrations of other components were adjusted using high-purity ferroalloy or lumpy or granular pure metals that contained almost no impurities such as Ti. Hot rolling was carried out under the condition that after slab heating at 1250° C. and after the initial (first) pass of hot rolling, each slab was held at 1000° C. or higher for 60 seconds to produce a hot-rolled sheet with a thickness of 2.5 mm.

These hot-rolled sheets were subjected to hot-rolled sheet annealing at 900° C., cold rolled to 1.3 mm, and then subjected to intermediate annealing. In the intermediate annealing, the temperature was gradually changed from the lead end to the tail end of the coil, so that the temperature of the coil lead end was set at 950° C. and the coil tail end at 1050° C. The annealed coils were cold rolled to a final thickness of 0.23 mm, decarburized, and annealed for primary recrystallization. Subsequently, an annealing separator mainly composed of MgO was applied, and final annealing including secondary recrystallization process and purification process was carried out at the maximum temperature of 1150° C. with the soaking time of 10 hours. The resulting coils were coated with an insulation coating consisting of colloidal silica and magnesium phosphate, and baked at 850° C. to make product sheets.

The iron loss characteristics were evaluated for each product sheet thus obtained. The iron loss ($W_{17/50}$) was measured continuously over the entire length of each product sheet coil and the lowest value (minimum), which is the best value, and the highest value (maximum), which is the worst value, were evaluated. For each coil, samples were taken from the center of the longitudinal direction and the center of the widthwise direction and analyzed for Ti concentration. At the same time, a test specimen for L-section observation was taken and observed 90 mm$^2$ in a continuous field of view, and compositional analysis by EDX was performed for all grains whose diameter was 200 nm or more in the equivalent diameter from the images of grains, and the number of grains containing both Ti and N were counted and divided by the area of the observation field to obtain a grain density in the steel. The results are listed in Table 3. The concentrations of C, Si, and Mn of the product sheets were all C: 0.001%, Si: 3.35%, and Mn: 0.03%. The concentrations of Se, Te, and O were all 30 ppm.

It can be seen from the table that the variation of magnetic properties is reduced and suitable properties are maintained by following the present disclosure.

TABLE 1

| Ti concentration of molten steel (ppm) | | Slab components | | | | Product sheet evaluation | | | | | Ti concentration (ppm) | | Grain density in steel | Product sheet properties $W_{17/50}$ (W/kg) | | Remarks |
|---|---|---|---|---|---|---|---|---|---|---|---|---|---|---|---|---|
| Before continuous casting | | | | | | Steel composition | | | | | | | | | | |
| Total Ti | Acid-soluble | Al | S | N | Others | (ppm) | | | | | Total Ti | Acid-soluble | | minimum | maximum | |
| | | | | | | Al | S | N | Others | | | | | | | |
| 25 | 20 | 80 | 25 | 100 | — | 34 | 16 | 35 | — | | 23 | 14 | 0.22 grains/mm$^2$ | 0.852 | 0.861 | Comparative example |
| 25 | 20 | 80 | 25 | 40 | — | 35 | 16 | 12 | — | | 24 | 13 | 0.17 grains/mm$^2$ | 0.842 | 0.848 | Example |
| 25 | 20 | 80 | 25 | 40 | Sb: 300, P: 600 | 35 | 16 | 12 | Sb: 260, P: 590 | | 23 | 15 | 0.19 grains/mm$^2$ | 0.835 | 0.840 | Example |
| 55 | 35 | 80 | 25 | 40 | Sb: 300, P: 600 | 33 | 17 | 16 | Sb: 260, P: 580 | | 53 | 31 | 0.48 grains/mm$^2$ | 0.857 | 0.866 | Comparative example |
| 52 | 29 | 80 | 24 | 40 | Sb: 300, P: 600 | 34 | 17 | 15 | Sb: 260, P: 580 | | 50 | 25 | 0.46 grains/mm$^2$ | 0.865 | 0.864 | Comparative example |

TABLE 1-continued

| Ti concentration of molten steel (ppm) | | Slab components (ppm) | | | | Steel composition (ppm) | | | | Ti concentration (ppm) | | Grain density in steel | Product sheet properties $W_{17/50}$ (W/kg) | | Remarks |
|---|---|---|---|---|---|---|---|---|---|---|---|---|---|---|---|
| Before continuous casting | | | | | | | | | | | | | | | |
| Total Ti | Acid-soluble | Al | S | N | Others | Al | S | N | Others | Total Ti | Acid-soluble | | minimum | maximum | |
| 14 | 10 | 50 | 20 | 20 | Mo: 100, B: 3 | 19 | 8 | 9 | Mo: 90, B: <1 | 12 | 8 | 0.07 grains/mm² | 0.832 | 0.836 | Example |
| 30 | 20 | 70 | 35 | 30 | Cr: 400 | 30 | 22 | 15 | Cr: 400 | 23 | 13 | 0.15 grains/mm² | 0.833 | 0.838 | Example |
| 30 | 20 | 130 | 40 | 25 | Cr: 400 | 65 | 28 | 11 | Cr: 400 | 22 | 13 | 0.12 grains/mm² | 0.863 | 0.869 | Comparative example |
| 20 | 15 | 40 | 30 | 25 | Cu: 200, Nb: 10, P: 50 | 14 | 16 | 7 | Cu: 170, Nb: 2, P: 45 | 16 | 11 | 0.10 grains/mm² | 0.833 | 0.837 | Example |
| 20 | 15 | 40 | 60 | 25 | Cu: 200, Nb: 10, P: 50 | 16 | 36 | 7 | Cu: 180, Nb: <1, P: 40 | 13 | 10 | 0.12 grains/mm² | 0.862 | 0.866 | Comparative example |
| 20 | 10 | 60 | 25 | 35 | Ni: 100 | 20 | 11 | 16 | Ni: 100 | 14 | 7 | 0.07 grains/mm² | 0.831 | 0.834 | Example |
| 3 | <1 | 60 | 25 | 35 | Ni: 100 | 22 | 13 | 18 | Ni: 100 | <1 | <1 | <0.01 grains/mm² | 0.831 | 0.866 | Comparative example |
| 20 | 10 | 65 | 25 | 35 | Ni: 100, Sn: 500 | 23 | 11 | 16 | Ni: 90, Sn: 400 | 14 | 8 | 0.08 grains/mm² | 0.829 | 0.832 | Example |

Example 2

When preparing a steel by smelting with a target composition of C: 0.05%, Si: 3.2%, Mn: 0.05%, Cr: 0.03%, P: 0.01%, acid-soluble Al: 30 ppm, S: 20 ppm, N: 30 ppm, Se: 50 ppm, Te: 30 ppm, and O: 20 ppm, a slab A was produced by adding ferroalloys such as FeMn, FeCr, and FeP containing Ti as impurities after the addition of FeSi, then, after the analysis of Mn, Cr, P, and Ti, adding lumpy Al, and further adding small amounts of missing components. As a comparison, two slabs B, in which ferroalloys were added before the addition of FeSi and small amounts of missing components were added after the addition of lumpy Al, and two slabs C, in which all the concentrations were adjusted after the addition of lumpy Al, were prepared respectively. In addition, two slabs D to F of the compositions listed in Table 2 were prepared respectively by the production procedure of slab A.

After that, slab heating was performed to 1200° C., respectively, and hot-rolled sheets with a thickness of 2 mm were prepared under hot rolling condition 1, in which the temperature was held at or above 1000° C. for 60 seconds after the initial pass of hot rolling, and hot rolling condition 2, in which the temperature was lowered to 980° C. within 30 seconds after the initial pass of hot rolling, respectively.

When these hot-rolled sheets were subjected to hot-rolled sheet annealing, the temperature was gradually changed from the lead end to the tail end of each coil, so that the temperature of the coil lead end was set at 1000° C., the center of the coil in the longitudinal direction at 1025° C., and the tail end of the coil at 1050° C. The annealed coils were cold rolled to a final thickness of 0.27 mm, decarburized, and annealed for primary recrystallization. Subsequently, an annealing separator mainly composed of MgO was applied, and final annealing including secondary recrystallization process and purification process was carried out at the maximum temperature of 1200° C. with the soaking time of 10 hours. The resulting coils were coated with an insulation coating consisting of 60% colloidal silica and aluminum phosphate and baked at 800° C.

For each material, Epstein test pieces were cut from the tip, center, and tail end positions of the coil, and the iron loss ($W_{17/50}$) was measured, and the average value was calculated. The average values of the measured results of iron loss are listed in Table 2, corresponding to the temperature at the time of hot-rolled sheet annealing, respectively. The concentrations of C, Si, and Mn in the product sheets were all C: 0.001%, Si: 3.2%, and Mn: 0.05%. The concentrations of Se, Te, and O in the product sheets were all Se: 10 ppm, Te: 5 ppm, and O: 20 ppm.

The coating and films were removed from the Epstein test pieces on which the iron loss measurement was made, the composition analysis was carried out, and test specimens for L-section observation were taken and observed 90 mm² in a continuous field of view. In this observation, compositional analysis by EDX was performed for all grains whose diameter was 200 nm or more in the equivalent diameter from the images of grains, and the number of grains containing both Ti and N was counted and divided by the area of the observation field to obtain a grain density in the steel.

From Table 2, it can be seen that by following the present disclosure, even if there is a variation in the annealing temperature in the intermediate process, the variation in magnetic properties is reduced and suitable properties are maintained.

TABLE 2

| Slab | Ti concentration of molten steel (ppm) | | | | Hot rolling condition | Product sheet evaluation | | | | | | | Iron loss of product sheet (W/kg) Temperature of hot-rolled sheet annealing | | | Remarks |
| | Before adding Al lump | | Before continuous casting | | | Steel composition (ppm) | | | | Ti concentration (ppm) | | Grain density in steel | | | | |
| | Total Ti | Acid-soluble | Total Ti | Acid-soluble | | Al | S | N | Others | Total Ti | Acid-soluble | | 1000 °C. | 1025 °C. | 1050 °C. | |
|---|---|---|---|---|---|---|---|---|---|---|---|---|---|---|---|---|
| A | 30 | 15 | 33 | 17 | 1 | 10 | 14 | 9 | — | 29 | 15 | 0.22 grains/mm² | 0.885 | 0.882 | 0.883 | Example |
|   |    |    |    |    | 2 | 9  | 12 | 8 | — | 29 | 16 | 0.04 grains/mm² | 0.892 | 0.884 | 0.897 | Comparative example |
| B | 4  | 3  | 7  | 4  | 1 | 9  | 13 | 7 | — | 7  | 3  | 0.01 grains/mm² | 0.889 | 0.882 | 0.901 | Comparative example |
|   |    |    |    |    | 2 | 11 | 14 | 8 | — | 6  | 3  | <0.01 grains/mm² | 0.888 | 0.881 | 0.903 | Comparative example |
| C | 2  | 1  | 46 | 37 | 1 | 11 | 14 | 8 | — | 43 | 35 | 0.47 grains/mm² | 0.904 | 0.904 | 0.906 | Comparative example |
|   |    |    |    |    | 2 | 12 | 13 | 8 | — | 42 | 34 | 0.28 grains/mm² | 0.901 | 0.899 | 0.906 | Comparative example |
| D | 31 | 20 | 35 | 19 | 1 | 12 | 13 | 8 | Mo: 100, Sb: 200, P: 400 | 28 | 15 | 0.21 grains/mm² | 0.879 | 0.880 | 0.877 | Example |
|   |    |    |    |    | 2 | 11 | 13 | 9 | Mo: 100, Sb: 200, P: 400 | 29 | 15 | 0.04 grains/mm² | 0.888 | 0.880 | 0.891 | Comparative example |
| E | 32 | 18 | 34 | 17 | 1 | 10 | 14 | 7 | Cr: 400, Cu: 80, Nb: 20 | 29 | 13 | 0.18 grains/mm² | 0.877 | 0.875 | 0.879 | Example |
|   |    |    |    |    | 2 | 10 | 13 | 8 | Cr: 400, Cu: 80, Nb: 20 | 28 | 14 | 0.03 grains/mm² | 0.882 | 0.888 | 0.895 | Comparative example |
| F | 29 | 17 | 32 | 16 | 1 | 11 | 12 | 9 | Ni: 100, Sn: 100, B: 10 | 27 | 13 | 0.17 grains/mm² | 0.878 | 0.876 | 0.874 | Example |
|   |    |    |    |    | 2 | 9  | 14 | 9 | Ni: 100, Sn: 100, B: 10 | 27 | 13 | 0.03 grains/mm² | 0.896 | 0.890 | 0.884 | Comparative example |

The invention claimed is:

1. A grain-oriented electrical steel sheet comprising:
a chemical composition consisting of, in mass %, C: 0.005% or less, Si: 2.0% to 4.5%, and Mn: 0.01% to 0.5%, and, in mass ppm, N: 20 ppm or less, each of Se, Te, and O: less than 50 ppm, S: less than 30 ppm, and acid-soluble Al: less than 40 ppm, and Ti: less than 30 ppm, of which 5 ppm or more and 25 ppm or less is acid-soluble Ti, and optionally, in mass %, at least one selected from the group consisting of Ni: 1.50% or less, Sn: 0.50% or less, Sb: 0.50% or less, Cu: 0.50% or less, Mo: 0.50% or less, P: 0.50% or less, Cr: 1.50% or less, B: 0.0050% or less and Nb: 0.0100% or less, with the balance being Fe and inevitable impurities; and
precipitates containing Ti and N with a grain size of 200 nm or more at a frequency of 0.05 grains/mm² or more.

2. A method of producing the grain-oriented electrical steel sheet as recited in claim 1, the method comprising:
casting a steel slab from molten steel, the steel slab having a chemical composition containing, in mass %, C: 0.08% or less, Si: 2.0% to 4.5%, and Mn: 0.01% to 0.5%, and, in mass ppm, Ti: less than 50 ppm, each of Se, Te, and O: less than 50 ppm, S: less than 50 ppm, acid-soluble Al: 20 ppm or more and less than 100 ppm, and N: 80 ppm or less, and optionally, in mass %, at least one selected from the group consisting of Ni: 0.005% to 1.50%, Sn: 0.01% to 0.50%, Sb: 0.005% to 0.50%, Cu: 0.01% to 0.50%, Mo: 0.01% to 0.50%, P: 0.0050% to 0.50%, Cr: 0.01% to 1.50%, B: 0.0001% to 0.0050%, and Nb: 0.0005% to 0.0100%, with the balance being Fe and inevitable impurities;
subjecting the steel slab to hot rolling including an initial rolling reduction after which the steel slab is held at a temperature of 1000° C. or higher for a period of 40 seconds or more to obtain a hot-rolled sheet;
then annealing and rolling the hot-rolled sheet to obtain a cold-rolled sheet having a final sheet thickness;
then subjecting the cold-rolled sheet to primary recrystallization annealing;
then subjecting the cold-rolled sheet to secondary recrystallization annealing; and
then forming an insulating coating on the cold-rolled sheet,
wherein the molten steel contains Ti in an amount of less than 50 ppm, of which 5 ppm or more and 30 ppm or less is acid-soluble Ti.

3. The method of producing the grain-oriented electrical steel sheet according to claim 2,
wherein the molten steel has a chemical composition adjusted such that a Si-containing ferroalloy, an Al-containing ferroalloy, and a Ti-containing ferroalloy are added in order of adding 50% or more of a total amount of the Ti-containing ferroalloy after adding the Si-containing ferroalloy and before adding the Al-containing ferroalloy, to make an amount of Ti in the molten steel at least less than 50 ppm, of which 5 ppm or more and 30 ppm or less is acid-soluble Ti.

4. A hot-rolled steel sheet for use in production of a grain-oriented electrical steel sheet, the hot-rolled steel sheet comprising:

a chemical composition consisting of, in mass %, C: 0.08% or less, Si: 2.0% to 4.5%, and Mn: 0.01% to 0.5%, and, in mass ppm, Ti: less than 50 ppm, of which 5 ppm or more and 30 ppm or less is acid-soluble Ti, each of Se, Te, and O: less than 50 ppm, S: less than 50 ppm, acid-soluble Al: 20 ppm or more and less than 100 ppm, and N: 80 ppm or less, and optionally, in mass %, at least one selected from the group consisting of Ni: 0.005% to 1.50%, Sn: 0.01% to 0.50%, Sb: 0.005% to 0.50%, Cu: 0.01% to 0.50%, Mo: 0.01% to 0.50%, P: 0.0050% to 0.50%, Cr: 0.01% to 1.50%, B: 0.0001% to 0.0050% and Nb: 0.0005% to 0.0100%, with the balance being Fe and inevitable impurities; and precipitates containing Ti and N with a grain size of 200 nm or more at a frequency of 0.05 grains/mm$^2$ or more.

5. The grain-oriented electrical steel sheet according to claim 1, wherein a steel substrate comprises the chemical composition and the precipitates.

\* \* \* \* \*